Oct. 16, 1962     W. BOCK ET AL     3,058,143

WIPER ARM FOR WINDSHIELD WIPING APPARATUS

Filed Feb. 12, 1959

WILLY BOCK
ALFRED KOHLER
INVENTORS.

BY *Dicke & Craig*

ATTORNEYS

United States Patent Office 3,058,143
Patented Oct. 16, 1962

3,058,143
WIPER ARM FOR WINDSHIELD WIPING APPARATUS
Willy Bock and Alfred Kohler, Bietigheim, Wurttemberg, Germany, assignors to SWF-Spezialfabrik für Autozubehör Gustav Rau G.m.b.H., Bietigheim, Wurttemberg, Germany
Filed Feb. 12, 1959, Ser. No. 792,753
5 Claims. (Cl. 15—250.34)

The present invention relates to improvements in windshield wipers for motor vehicles, and more particularly to novel means for securing the wiper arm of a windshield wiper to the reciprocating drive shaft thereof.

There have been various kinds of means prior to this invention for securing the wiper arm to the wiper shaft. Many of these means had the disadvantage of loosening during the operation of the windshield wiper so that the wiper arm with the wiper blade thereon would be lost. Thus, for example, there has been one previous device in which the wiper arm was pivotably mounted on a connecting member which had an aperture with a fluted wall into which the head portion of the wiper shaft with corresponding flutes thereon could be inserted and which was then retained therein by a locking spring which engaged behind this head portion. This locking spring was designed and adjusted so as to permit the locking action to be easily overcome when the wiper arm was to be withdrawn. However, this locking device also had the disadvantage of easily releasing accidentally so that the wiper arm would come loose and be lost during the operation of the wiper motor.

It is an object of the present invention to provide a device similar to the device described above which permits the wiper arm to be easily removed from the wiper shaft when in a pivoted inoperative position, which, however, locks the wiper arm irremovably to the shaft when it is pivoted to the operative position so that the wiper arm with the wiper blade thereon can never be lost in such position.

For attaining this object, the wiper arm has a mounting member of sheet metal which is pivotably secured to a connecting member which has an aperture with a fluted wall into which the head portion of the wiper shaft with corresponding flutes thereon may be inserted. This connecting member is provided with at least one spring member of a suitable shape which, when the wiper arm is being pivoted to its operative position, will be pressed toward the wiper shaft by a side wall of the mounting member, and a projecting portion of this spring member will then engage behind the fluted head portion of the wiper shaft which is inserted into the fluted aperture in the connecting member and will thereby securely lock the connecting member to the wiper shaft. Thus, while the wiper arm may be easily fitted upon or withdrawn from the wiper shaft when it is pivoted to the inoperative position, it will be absolutely prevented from being removed from the wiper shaft when it is pivoted to the normal operative position.

In order to insure a very secure locking action, the connecting member is preferably provided with a pair of spring members at diametrically opposite points thereof. These spring members are biased so as to spring apart when the mounting member with the wiper arm thereon is being pivoted to the inoperative position. Thus, in this position, the inwardly directed projections or inwardly bent end portions of the spring members are spread apart so as to be spaced at a greater distance from each other than the size of the maximum inner diameter of the fluted aperture in the connecting member so that the latter with the complete wiper arm assembly thereon may be easily fitted upon or withdrawn from the fluted head portion of the wiper shaft. When the connecting member is thus slid fully over this head portion and the wiper arm is then pivoted to the operative position, the two spring members will be pushed toward each other by the side walls of the mounting member so that the inwardly directed projections or end portions on the spring members will engage behind the head portion of the wiper shaft and absolutely prevent any removal of the wiper arm from the wiper shaft. A coil spring which is interposed between the connecting member and the mounting member then maintains the wiper arm in the operative position and presses the wiper blade at the required pressure upon the windshield.

These objects, features, and advantages of the present invention will now be described in detail with reference to the accompanying drawings of a preferred embodiment of the invention, in which:

FIGURE 2 shows an enlarged perspective view of the mounting member of the wiper arm and the connecting member pivoted relative to each other to the inoperative position for sliding the latter upon the head portion of the wiper shaft; while

Figure 1:
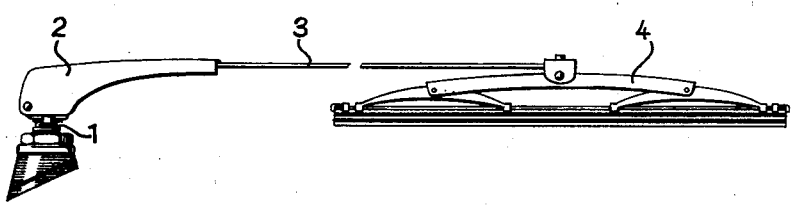
FIGURE 1 shows a side view of the entire windshield wiper assembly.
Figure 2:
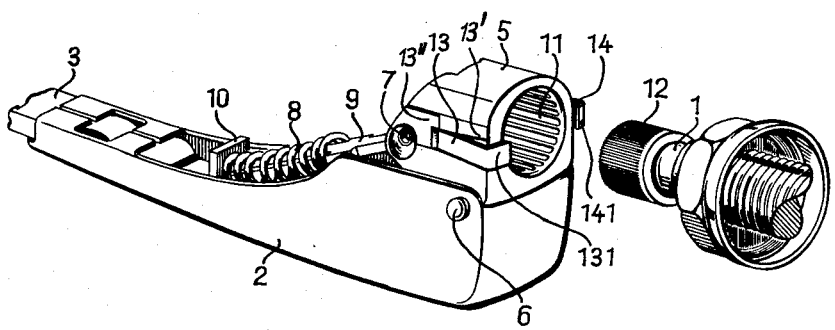
Figure 3:
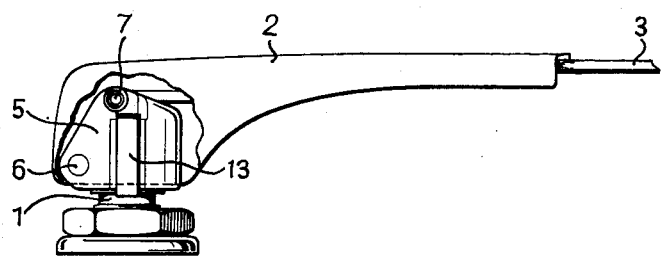
FIGURE 3 shows a side view, partly broken away, of the mounting and connecting members in the operative position and securely locked to the wiper shaft.

Referring to the drawings, FIGURE 1 shows a general view of the windshield wiper assembly according to the invention which externally appears to be similar to other assemblies previously known insofar as it essentially consists of a wiper shaft 1, a mounting member 2 secured to and pivotable relative to the free end of shaft 1 and carrying a wiper arm 3, and a wiper blade 4 pivotably connected to the end of wiper arm 3. The novel structure according to the invention consists in the design of the mounting member 2 and in the means for pivotably securing the same to wiper shaft 1. As illustrated in FIGURES 2 and 3, the mounting member 2, which is stamped out of sheet metal has a connecting member 5 secured thereto, is pivotable about a pin 6 which is spaced from and transverse to the axis of shaft 1. Connecting member 5 carries a pivot pin 7 on which one end of a rod 9 is mounted, the other end of which is slidable in an aperture, not shown, in a crosspiece 10 which is secured to mounting member 2. Rod 9 carries a coil spring 8, one end of which rests on rod 9, while the other end engages against crosspiece 10. Connecting member 5 has a fluted aperture 11 for receiving the similarly fluted sleeve 12 which is secured to the end of wiper shaft 1.

For releasably locking the connecting member 5 to shaft 1, a pair of spring members 13 and 14 are secured at one end to the outer wall of connecting member 5 which preferably is provided with suitable recesses 13' to receive spring members 13 and 14 so that, when the latter are pressed flat against connecting member 5, their outer surfaces will be flush with the outer surface of the connecting member. The other end portions 131, 141 of spring members 13, 14 are bent toward each other and are made of a length so that, when the spring members are pressed flat against the connecting member, these bent-over end portions 131, 141 will project inwardly beyond the fluted wall of aperture 11. As illustrated in FIGURE 2, spring members 13 and 14 are biased so that, when mounting member 2 is pivoted to the position shown, the spring members will be sprung outwardly and the spring ends 131, 141 will be spaced from each other at a greater distance than the diameter of aperture 11. If sleeve 12 on shaft 1 is then inserted into aperture 11, spring ends 131, 141 will not engage with sleeve 12 until mounting member 2 is pivoted about pin 6 to the operative position of mounting member 2 and wiper arm 3 as shown in FIGURE 3 when spring members 13 and 14 will be bent toward each other by the inner wall surfaces of mounting member 2. Spring ends 131 and 141 will then engage behind sleeve 12 so as to lock connecting member 5 securely and irremovably to wiper shaft 1. On the other hand, when members 2, 3, and 4 are pivoted about pivot pin 6 to the inoperative position, as shown in FIGURE 2, spring members 13 and 14 will be released from the side walls of member 2 and their ends 131 and 141 will disengage from the rear side of sleeve 12, so that connecting member 5 with the other parts of the wiper arm assembly thereon may be easily removed from sleeve 12 on wiper shaft 1.

Instead of securing one end of each spring member 13, 14 to connecting member 5, both spring members together may also be made of one substantially U-shaped spring strip which is passed through a pair of diametrically opposite apertures or recesses 13″ in connecting member 5. The back portion (not shown) of this spring strip 13, 14 will then also serve as a stop member for limiting the depth to which the head portion of shaft 1 can be inserted into aperture 11. When the wiper arm is then pivoted to the operative position, this back portion in cooperation with the spring ends 131, 141 will lock the connecting member 5 to sleeve 12 to prevent any sliding movement between these members.

Through the eccentrical position of pivot pin 7 of rod 9 relative to the main pivot pin 6 of connecting member 5, coil spring 8 will maintain members 2 and 5 either in the inoperative position, as shown in FIGURE 2, or in the operative position, as shown in FIGURE 3, in which this spring will also press the wiper blade 4 with the required pressure upon the windshield.

Of course, instead of securing a separate fluted sleeve 12 on the wiper shaft 1, the flutes may also be provided directly on the end of the shaft, and an annular groove may then be cut into the shaft into which the spring ends 131, 141 may engage when the wiper arm is pivoted to the operative position.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. In a windshield wiping apparatus having a wiper shaft and a wiper arm with an associated wiper blade removably secured to said wiper shaft, the improvement comprising a mounting member secured to one end of said wiper arm remote from said wiper blade, said mounting member having upper wall means and side walls extending therefrom to define an open space therebetween, a connecting member adapted to be positioned within said open space in said mounting member when said wiper blade is in an operative position, means defining a pivot axis enabling said mounting member to pivot downwardly over said connecting member to position said connecting member within said open space, said connecting member being provided with aperture means removably receiving one end of said wiper shaft, said wiper shaft having means complementary to said aperture means of said connecting member non-rotatably securing said wiper shaft in said connecting member, at least one spring member mounted on said connecting member, said spring member being biased so as to be sprung outwardly from said connecting member when said mounting member is pivoted away from said connecting member, means comprising said side walls of said mounting member to press said spring member inwardly upon pivoting movement of said mounting member into operative position over said connecting member, and said wiper shaft being provided with means to engage an edge portion of said spring member to thereby lock said connecting and mounting members irremovably to each other when said mounting member is in operative position.

2. A windshield wiping apparatus as defined in claim 1, wherein the means on said wiper shaft complementary to said aperture means includes a fluted sleeve fitted over and secured to the end of said shaft, said spring member including an elongated strip secured at one end to said connecting member and extending along the outer surface of the side wall of said connecting member, and having on its other end a projection extending partly over an annular end wall of said connecting member, said spring member being pressed substantially flat against said side wall of said connecting member by one of the side walls of said mounting member when said mounting member is pivoted downwardly over said connecting member so that, when said fluted sleeve on said wiper shaft is inserted into said aperture and said wiper arm is then pivoted to the operative position, said projection on said spring member will engage behind said sleeve.

3. A windshield wiping apparatus as defined in claim 1, further comprising a second spring member wherein said spring members are mounted on said connecting member at diametrically opposite points relative to said aperture means, the free ends of said projections on said spring members being spaced from each other at a distance greater than the diameter of said aperture means when said connecting member is pivoted out of said operative position, so that said sleeve on said wiper shaft may then be easily inserted into and removed from said aperture means.

4. A windshield wiping apparatus as defined in claim 3, wherein said two spring members together form one continuous, substantially U-shaped spring strip having side arms extending along the outer surface of said connecting member, a back portion extending across said connecting member near the rear end thereof, and angular end portions forming said projections extending across the annular front surface of said connecting member toward said aperture, said back portion limiting the extent to which said wiper shaft may be inserted into said aperture means, said back portion and said angular end portions of said spring strip then substantially engaging with the front and rear surfaces of said complementary means on said wiper shaft to lock said connecting member and said shaft together so as to prevent any relative sliding movement thereof.

5. A windshield wiping apparatus as defined in claim 1, further comprising means including a coil spring interposed between said connecting and mounting members and acting upon said connecting member at a point spaced from the pivotal axis thereof so as to maintain said mounting member in the position in which it is pivoted away from said connecting member to permit said shaft to be easily inserted into and removed from said aperture means, said means including a coil spring also acting upon said mounting member in the operative position thereof to normally maintain said wiper blade in position upon a windshield.

References Cited in the file of this patent
UNITED STATES PATENTS 2,365,251    Curtiss               Dec. 19, 1944

FOREIGN PATENTS 791,420    Great Britain           Mar. 5, 1958